Figure 1:
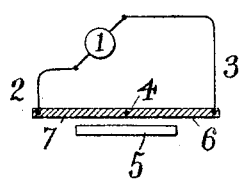

No. 797,747. PATENTED AUG. 22, 1905.
H. N. POTTER.
ELECTRIC FURNACE.
APPLICATION FILED JULY 23, 1903.

2 SHEETS—SHEET 1.

Witnesses:
Wm H. Capel

Inventor
Henry Noel Potter
by Charles A. Terry Atty

No. 797,747.  
H. N. POTTER.  
ELECTRIC FURNACE.  
APPLICATION FILED JULY 23, 1903.

PATENTED AUG. 22, 1905.

2 SHEETS—SHEET 2.

Witnesses:

Inventor

UNITED STATES PATENT OFFICE.

HENRY NOEL POTTER, OF NEW ROCHELLE, NEW YORK, ASSIGNOR TO GEORGE WESTINGHOUSE, OF PITTSBURG, PENNSYLVANIA.

ELECTRIC FURNACE.

No. 797,747.    Specification of Letters Patent.    Patented Aug. 22, 1905.

Application filed July 23, 1903. Serial No. 166,669.

*To all whom it may concern:*

Be it known that I, HENRY NOEL POTTER, a citizen of the United States, and a resident of New Rochelle, county of Westchester, State of New York, have invented certain new and useful Improvements in Electric Furnaces, of which the following is a specification.

I have discovered that when two parts of an otherwise continuous circuit are separated within a region of intense heat, as in the interior of a highly-heated tube-furnace, electric current will traverse the gap between the electrodes thus formed under a greatly reduced potential as compared with what would be required to maintain an arc under atmospheric conditions or even under conditions of moderate heat. This discovery can be utilized for the purpose of reinforcing the heat of the furnace itself, whether such heat is derived from an electric current or from any other source.

It is especially convenient to utilize the described arrangement in connection with an electric tube-furnace, and in the present description such a furnace will be assumed, although, as already indicated, heat may be derived from any preferred source. It is also true that the shape of the furnace may be varied to suit working conditions.

By putting a gap of the character described inside of a furnace and applying by means of the latter sufficient heat to render the gap conductive a condition is obtained where a current may be passed under such moderate differences of potential that it becomes practically possible to add to the heat of the furnace any desired quantity of heat developed in the gap. In this manner it is possible to produce a range of temperatures beginning with that reached by the unaided furnace and ending at temperatures at least as high as those of the electric arc.

In resistance-furnaces hitherto constructed there has been an upper limit to the temperature imposed by the heat conductivity of packings and by the speedy disintegration of the resistance constituting the furnace. The maximum temperature at which it has been practical to operate has been considerably lower than that produced by the arc. On the contrary, in arc-furnaces temperatures lower than that of the arc itself have been only obtainable at a distance from the arc, and such temperatures are difficult to maintain and control. By my system it becomes possible to pass current across a gap at voltages which are too low to maintain such current-passage unaided. From one point of view it may be stated that the function of ionization of the vapors in the gap is not solely performed by current traversing these vapors, but is assisted by an auxiliary ionizing agency. The conducting-gap thus established appears to have all the electrolyzing qualities of the electric arc, so that I am able to combine in the furnace the effects of great heat and those which are peculiar to the arc or conducting-gap. For the above reasons, without determining the question as to how nearly allied the described phenomenon is to an electric arc, I prefer to designate it as a "conducting-gap."

The furnace itself may be supplied by any adequate source of heat and may be of any convenient or suitable material. For example, it may be built of refractory earths and heated by oxy-gas jets. In general, however, I prefer to heat the furnace itself by electrical means, and when the furnace itself is supplied with heat from a source of electric current I may utilize an alternating current for generating the furnace portion of the heat and may then pass current across the gap in any desired quantity by means of either direct or alternating currents.

One of the simplest forms of furnace is an electric tube-furnace (such as that described in Letters Patent issued to me on the 9th day of December, 1902, numbered 715,508) provided with auxiliary electrodes between which the gap or gaps is or are established. These auxiliary electrodes may be of carbon, and in certain cases the wall of the tube-furnace or a portion thereof may itself constitute an electrode.

Another form is to use a furnace in which the heating-conductor is a dry electrolyte or a mixture of dry electrolytes in the form of a tube within which may be mounted auxiliary electrodes composed of conductors of either the first or second class, one of which may, as in the case of carbon, be the wall of the heating-tube itself. A modification of this latter form is to construct the tubular heating-conductor of iridium or similar material, within which an auxiliary electrode or electrodes consisting of a conductor or conductors of the second class are suitably mounted.

The regulation of temperature in the above furnace may be effected in various ways. For example, the temperature of the main heating-furnace may be varied. The length of the gap may also be varied and the auxiliary work expended at the gap. In certain forms of furnace the gap becomes the space between a central rod and the walls of the tubular furnace. The current-flow across the gap may therefore be considered radial and spread over a considerable extent. This is a particularly satisfactory form for gas reactions, for which this type of furnace is in general especially well adapted.

To render my invention clear to those skilled in the art, I have illustrated certain embodiments in the accompanying drawings, Figures 1, 2, 3, 4, 5, 6, 7, 8, 9, 10, 11, 12, 13, 14, and 15. It will be understood that these drawings are to a large extent diagrammatic, such obvious and subordinate details as terminal constructions, packing, housings, &c., being omitted, as their form and application can be appreciated by reference to publications, in particular to my former Letters Patent referred to above.

In the first figure of the drawings, 1 represents a suitable source of current connecting through leads 2 and 3 with a heating resistance 4, composed of carbon, iridium, or refractory dry electrolyte, either solid or fused. A conductor 5, also of any refractory material, is arranged in general parallel to and at a short distance from the resistance 4. If now a current be passed through the resistance 4, there will be a potential drop between the points 6 and 7 of the rod 4, which points lie opposite the ends of the conductor 5. The rod 5 will be at the same potential throughout as long as it does not carry current. There will therefore be set up a difference of potential between the resistance 4 and the conductor 5, which will vary from point to point along the conductor 5. If the temperature produced in the resistance 4 and communicated to its environment is sufficiently high, current will leak across from the resistance 4 to the conductor 5 and after flowing a distance in the conductor will leak back again to the resistance, thus traversing the intervening vapor or gas.

Figure 2:
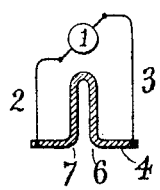

By bending the conductor 4 of Fig. 1 into a loop, as shown in Fig. 2, the points of different potential represented by 6 and 7 may be brought close together and the conductor 5 will be superfluous, the leakage taking place directly between the points 6 and 7. This is analogous to the leakage under conditions of high vacuum in certain incandescent lamps.

Figure 3:
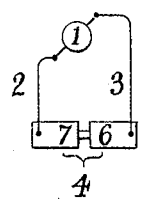

Instead of bending the conductor 4 the points 6 and 7 of different potentials may be brought closer together by making part of the conductor 4 of relatively smaller diameter, as shown in Fig. 3. Here the leakage current will flow parallel to and around the contracted portion of the part 4. This idea may be applied to a porous or granular or powdered conductor, for, if we consider two contacting grains, as in Fig. 4, where they are shown greatly magnified, it is clear that the grains 6 and 7 together constitute the electrically-uninterrupted conductor 4 of the former figures. They contact over a small area and approach closely, but do not contact at other places. Thus we have the conditions of heat, proximity, and difference of potential, which has been shown to be sufficient to effect a leakage current across a gap.

Figure 5:
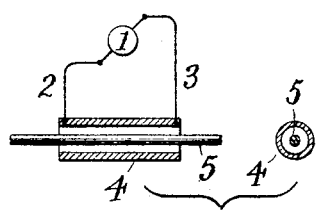
Figure 6:
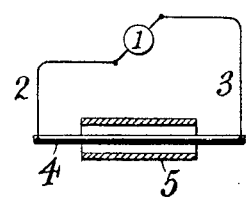

There are a great variety of forms of apparatus suited to assist in maintaining the conductivity of a gap by external thermic means, and these are in general modifications of those already shown. In Fig. 5 the design of Fig. 1 is modified by developing the conducting resistance 4 into a tube surrounding the rod conductor 5, while in Fig. 6 the conductor 5 becomes a tube surrounding the resistance 4.

Figure 7:
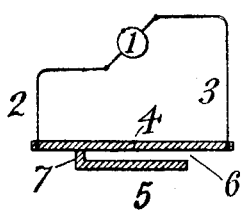
Figure 8:
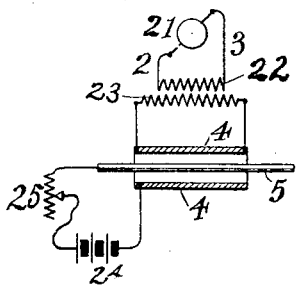

It is clear that if for any reason adjacent portions of the elements 4 and 5 should be held at the same potential this may be accomplished by connecting them by a non-gaseous conductor instead of through a gas or vapor. In Fig. 7 the construction illustrated in Fig. 1 is shown with such modification. In the foregoing the difference of potential maintaining the gap-current has not exceeded that employed in heating the resistance 4. However, such a limitation is not necessary, nor is it necessary that the same kind of current be used for the gap and the heating resistance 4. For example, in Fig. 8 I show a modification of the construction shown in Fig. 5, wherein an alternating current is employed to heat the part 4 and a direct current is maintained across the gap. The alternating-current source is shown at 21, and at 22 and 23, respectively, appear the primary and secondary of a transformer. The source of direct current is indicated at 24 and a regulating resistance at 25.

Figure 9:
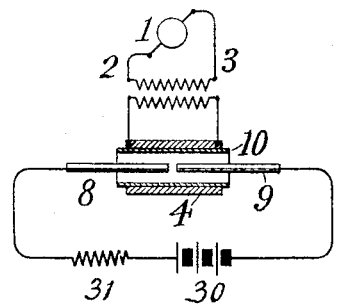

It is not always desirable to have the heating resistance 4 constitute one electrode of the gap. For instance, it is often desirable to make the part 4 of carbon and line it with a refractory lining to prevent carbon vapors within the tube. In such a case the electrodes may be iridium or electrolytic conductors arranged as shown in Fig. 9. Here 8 and 9 are gap-electrodes with a source of voltage 30 and a regulator 31. A lining for the heating-tube 4 is shown at 10.

Figure 10:
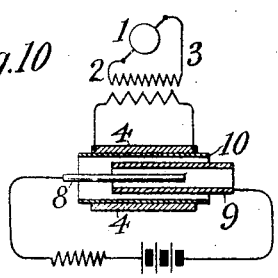

It is sometimes an advantage to make the area of the conducting-gap large and the current density therein fairly even. This is accomplished by producing practically a fixed drop across all portions of an equally long gap, as shown in Fig. 10.

Figure 11:
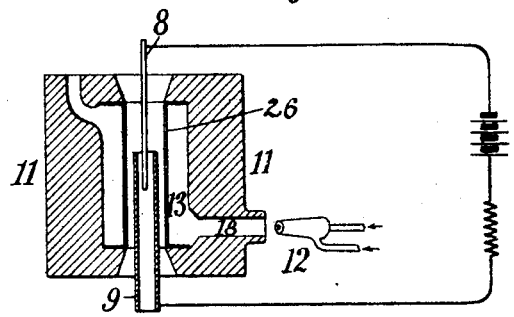

In Fig. 11 is shown an arrangement wherein the heating function of the part 4 is performed by an oxygen-fed flame. This arrangement is particularly in place where iridium is heated, as it has been observed that this expensive material wastes away much quicker when heated electrically than when heated to the same temperature by a flame. At 11 appears the outer furnace-wall, at 12 the burner, and at 26 an iridium tube.

It is advantageous where extremely high temperatures are required to produce the heating by an arc instead of by gas or resistance heating of solid or liquid conductors. Such an arc-heated gap is shown in Fig. 12, which is a Moissan furnace with a tube 16 of carbon, within being the gap-electrode 8, the tube constituting the electrode 9, as in Figs. 10 and 11.

Figure 13:
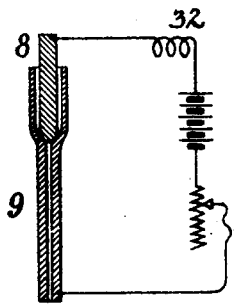
Figure 14:
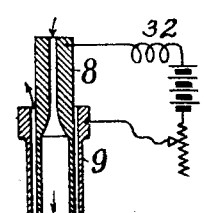

There is still another variation of the idea introducing the element of time, whereby during an interval heat is stored until a sufficient temperature is reached, then the heating-current interrupted and a gap introduced supplied with a small potential difference not sufficient to produce a current to maintain the temperature. As long as the temperature remains high current will pass and will cease unless after a little, more heat is supplied. Such a device is shown in Figs. 13 and 14. Here the gap-electrodes 8 and 9 are shaped like parts of a valve and are shown in contact. Current traverses them and the contact, heating them. If now the potential be—let us say, ten volts, and a current of gas be forced upward through the electrode 9 the electrode 8 may be raised, producing a gap across which current will flow while all remains hot. By arranging the gas-pressure and gas-friction in the tubes properly a stuttering opening and closing of the contact between the electrodes will be effected and the gases passing submitted to the electrolyzing action of the electric gap-current. By the addition of a coil 32, possessing self-induction in series with the electrodes, the current across the gap can be increased by the coil discharge at each break when direct current is employed for operating the furnace. Care must be exercised, however, not to use enough self-induction to produce a constricted arc or spark discharge across the gap, as such a discharge would be local and much of the passing gas would not be subjected to the electrolyzing action.

Up to this point I have described relative arrangements of parts. It remains to show more specifically how such furnaces are controlled. There are several factors conspiring to produce a given condition, and in general a change in any of the factors will effect the resultant condition produced by all together.

Figure 12:
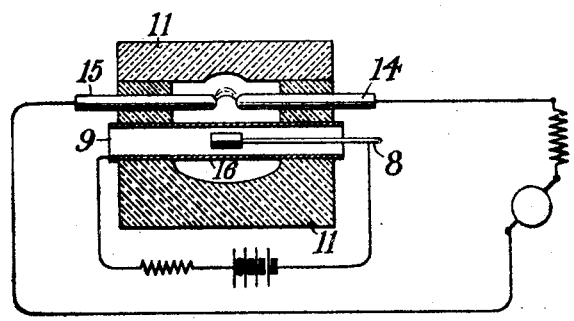

It is clear that the auxiliary heat can be controlled by regulating the current through the resistance 4 in Fig. 5, or through the arc in Fig. 12, or the gas-supply in Fig. 11. It is also clear that the gap-potential can be controlled in Figs. 8, 9, 10, 11, and 12. The area of the gap can be varied in Figs. 10 and 11 by pushing the electrode 8 more or less into electrode 9. The length of the gap can be varied in Fig. 9 by moving either electrode 8 or 9 axially relative to its coöperating member.

Figure 15:
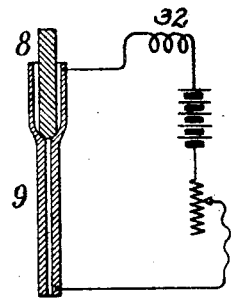

In Figs. 13 and 14 the period of vibration of the electrode 8 can be modified by controlling the gas-pressure, as stated, and the activity of the gap-current increased by increasing the self-induction of the circuit, including the electric source 33, the regulator 34, and the electrodes 9 and 8. A further modification can be effected by shunting the gap 8 9, as shown in Fig. 15.

In the case of a furnace such as illustrated in Fig. 11 or Fig. 12 the action is greatly affected by blowing a gas or mixture of gases or vapors through the tube 9. Such a gas cools the gap, and where a reaction is produced the cooling depends not only on the initial and end temperature of the gas, but also on the energy absorbed or set free by the reaction itself.

All methods of control affect the dimensions of the gap, the temperature of the gap, or the electric fall of potential across the gap, and any agency which affects any of these may serve as a control.

What has been said in the foregoing concerning the thermically-induced conductivity of the gap and the passage therethrough of current under moderate differences of potential must not be taken to exclude from my invention the combination of a gap, a source of high temperature affecting the gap, and a current across said gap under a difference of potential as high or higher than that necessary to maintain an arc. The auxiliary heat need not become unimportant even under these conditions, as its effect is to steady and expand the arc and to allow it to be lengthened more than otherwise possible. The tendency to constriction is reduced and in general the volume of the arc materially increased, so that the current tends to flow between the electrodes as if they were immersed in a conducting liquid. The temperature gradients are naturally less steep in such an arc, and it is therefore preferable where reactions are desired which are reversed by excessive temperatures.

Figure 4:
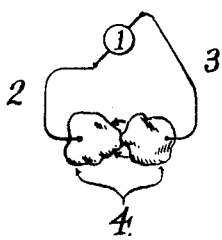
Figure 16:
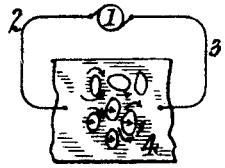

Fig. 16 represents a modification of the device shown in Fig. 4, the material in this instance being represented as porous, such a material serving the conditions required in that it has surfaces of different potential at high temperature and near together. Assuming that the porous material is in the form of a tube, gases might enter the inside of the tube and be subjected to electrification at high temperature in passing through the pores and might then pass out to a collecting device.

The furnace herein described may be used under conditions of pressure above or below atmospheric pressure.

In a divisional application filed July 1, 1905, Serial No. 267,913, claims are made upon certain features of construction disclosed herein.

I claim as my invention—

1. The method of supplying heat to a furnace of the character described, which consists in heating the body of the furnace by any suitable means, and adding to the heat thus produced the heat energy derived from a conducting-gap.

2. The method of supplying heat to an electric furnace, which consists in heating the furnace-walls by utilizing the body of the furnace as an electrical resistance, and adding to the heat thus produced the heat energy derived from a conducting-gap.

3. The method of reducing the terminal voltage of a conducting-gap, which consists in subjecting the said gap to the influence of great heat.

4. The method of reducing the terminal voltage of a conducting-gap, which consists in subjecting the said gap to the influence of great heat, and confining the gap within a suitable chamber.

5. The method of regulating the terminal voltage of a conducting-gap, which consists in subjecting the said gap to the influence of variable degrees of heat.

6. The method of regulating the terminal voltage of a conducting-gap, which consists in subjecting the said gap to the influence of great heat and varying the resistance of the circuit including the gap.

7. The method of producing reactions in a furnace, which consists in applying to the materials within the furnace, the effects of great heat derived from external sources, and the electrolyzing effects of a conducting-gap.

8. The method of producing reactions in an electric furnace, which consists in subjecting the materials to be acted upon to influence of intense heat from the walls of the furnace, and also subjecting them to the influence of a conducting-gap carrying a current of lower voltage than that of the normal electric arc.

9. The method of supplying heat from two sources to an electric furnace, which consists in utilizing as one source of heat the electrical resistance of a conducting solid body, and as the other source of heat the electrical resistance of a conducting gas or vapor, and regulating the relative values of the heat energy supplied from the said sources.

10. The method of producing heat inside an electric furnace, which consists in developing conductivities locally in two current-paths and heating such paths by the passage of electric current.

11. The method of producing heat inside an electric furnace, which consists in arranging a conducting resistance and a vapor resistance, one within the other, and heating both resistances simultaneously by the passage of electric current.

12. The method of producing heat inside an electric furnace, which consists in introducing into the interior of a solid conducting resistance a vapor resistance, heating the said conducting resistance and thereby rendering the said vapor resistance conductive and afterward utilizing the heat of both resistances.

Signed at New York, in the county of New York and State of New York, this 15th day of July, A. D. 1903.

HENRY NOEL POTTER.

Witnesses:
 WM. H. CAPEL,
 THOS. H. BROWN, Jr.